March 4, 1969   J. D. DANFORTH   3,431,077
ANALYTICAL APPARATUS
Filed July 18, 1966

Inventor:—
Joseph D. Danforth,
By Hibben, Noyes & Bicknell
Attys.

United States Patent Office 3,431,077
Patented Mar. 4, 1969

3,431,077
ANALYTICAL APPARATUS
Joseph D. Danforth, 1332 Broad St.,
Grinnell, Iowa 50112
Filed July 18, 1966, Ser. No. 565,853
U.S. Cl. 23—253   10 Claims
Int. Cl. G01n 31/08

This invention relates to a novel and improved analytical apparatus and more particularly to a novel and improved apparatus for use in the study and testing of solid materials.

It is known to couple a microreactor with a gas chromatograph for use in the evaluation of catalysts, in thermal decomposition studies, and in other procedures. However, such prior devices have utilized relatively complicated valve arrangements and sample collection tubes. Furthermore, the usefulness of these prior devices in catalytic studies or the like has been limited largely to investigations in which the reactants is a gas or an easily vaporized liquid.

A primary object of the present invention is to provide a novel and improved analytical apparatus which is adapted for the study and testing of solid materials by chromatographic techniques and which is relatively inexpensive and is simple in construction and operation.

A further object of the invention is to provide an apparatus of the foregoing character which is particularly adapted for evaluating catalysts and for studying the thermal stability of solid materials and the effect of various atmospheres on the same.

Another object of the invention is to provide an apparatus of the foregoing character which can be utilized with a wide range of gaseous or liquid reactants, including relatively high boiling liquids.

An additional object of the invention is to provide an apparatus of the foregoing character which has a plurality of reaction or test zones, whereby comparative studies can be carried out in a highly convenient manner.

Figure 1:
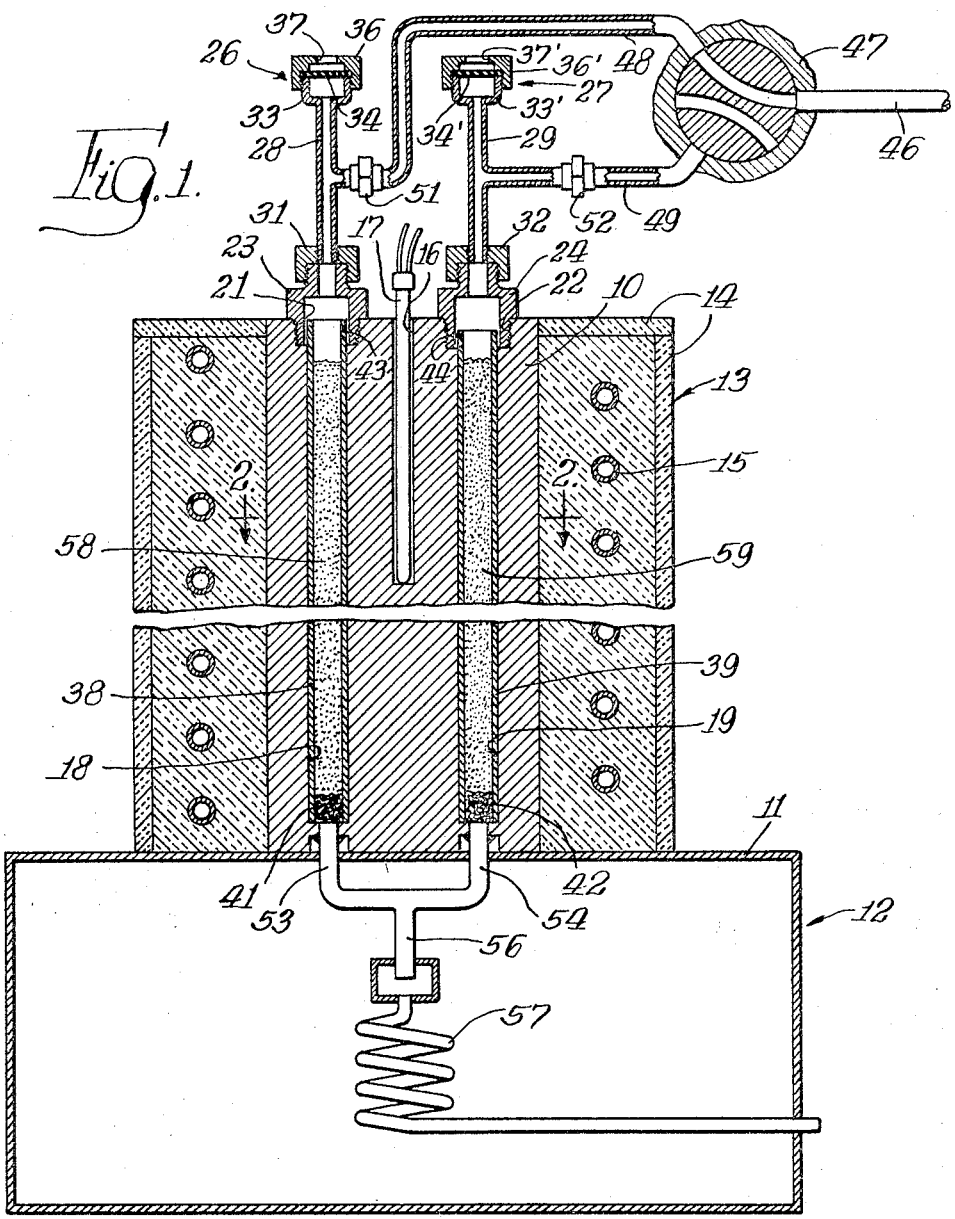
Figure 2:
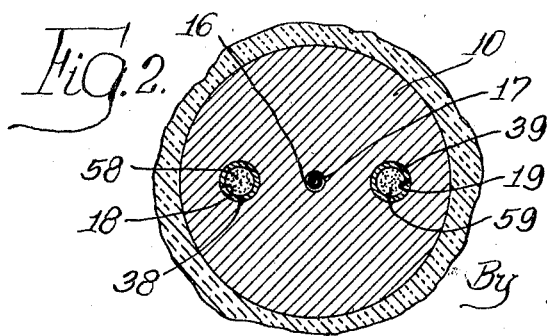

Other objects and advantages of the invention will be understood from the subsequent detailed description taken in conjunction with the accompanying drawing, wherein:

FIG. 1 is a partly schematic vertical sectional view of an apparatus comprising one specific embodiment of the invention; and FIG. 2 is a fragmentary horizontal cross-section taken along the line 2—2 of FIG. 1.

Referring to the drawing, the illustrated embodiment of the invention comprises a heat conducting body, preferably an elongated cylindrical metal block 10, which is mounted on the upper wall 11 of an enclosure 12. The block 10 is surrounded by a heating unit 13 having walls 14 of a suitable insulating material and an electrical resistance heating coil 15. A thermowell 16 is provided centrally of the block 10 and is fitted with a thermocouple 17 which is connected in a conventional control circuit (not shown) with the heating coil 15 for maintaining the temperature of the block 10 at a predetermined level.

The block 10 is provided with a plurality of chambers in the form of parallel axially extending bores or holes, two such bores being shown at 18 and 19 in this embodiment of the invention. Threaded counterbore portions 21 and 22 are provided in the block 10 at the upper inlet ends of the bores 18 and 19, respectively. Tubular reducer fittings 23 and 24 are removably threaded in the counterbores 21 and 22, respectively, and a pair of sample injection ports 26 and 27 are mounted in axial alignment above the bores 18 and 19 by means of a pair of vertical conduit sections 28 and 29 having threaded connectors 31 and 32 at their lower ends for removably attaching the same to the fittings 23 and 24, respectively.

The sample injection ports 26 and 27 have a well-known construction for permitting the introduction of a precise quantity of a fluid sample by means of a syringe. Thus, for example, the port 26 comprises an enlarged diameter cup portion 33 at the upper end of the conduit section 28 and a self-sealing disk 34, such as a silicone rubber disk, overlying the open upper end of the cup portion 33. The disk 34 is held in place by means of a removable cap member or nut 36 having a threaded connection with the cup portion 33 and having a central opening 37 for access to the disk 34. Similarly, the port 27 comprises a cup portion 33' on the conduit section 29, a disk 34', and a cap member 36' having an opening 37'.

The bores or chambers 18 and 19 are fitted with removable thin-walled tubular containers 38 and 39 which may conveniently be made of stainless steel. As hereinafter described in more detail, the tubular containers 38 and 39 are adapted to be loaded with catalyst or other solid test material. The lower ends of the tubes 38 and 39 are fitted with suitable plugs for retaining the material charged to the containers. In this instance, glass wool plugs 41 and 42 are employed, but, dependent upon the temperature of operation, other plug materials may be more suitable, e.g., ceramic plugs or drilled stainless steel plugs. The tubular containers 38 and 39 are provided with small holes 43 and 44 near their upper ends to facilitate removal of the tubes from the bores 18 and 19 by inserting a hook-shaped wire or other instrument in the openings 43 and 44.

Gas flow to the unit is provided by means of a supply line 46 connected to a suitable valve shown schematically at 47. The valve 47 provides fluid communication between the supply line 46 and the vertical conduit sections 28 and 29 of the sample injection ports by means of tubular members 48 and 49 having detachable connections 51 and 52 and joined with the conduit sections 28 and 29 intermediate the respective sample injection ports and the inlets to the chambers 18 and 19.

A pair of small diameter exit tubes 53 and 54 have a fluid-tight connection, as by silver soldering, to the lower outlet ends of the chambers 18 and 19 and extend through the wall 11 into the enclosure 12 where they merge into a common exit tube 56 to provide a discharge manifold. The tube 56 is directly connected to a conventional chromatographic column, shown schematically at 57, which is usually in the form of a relatively long tubular coil packed with a suitable solid absorbent material. The structure and operation of gas phase chromatographic units are well-known and need not be described in detail for purposes of the present invention. In general, however, a volatilized sample of the material being analyzed is passed through the packed column by means of a stream of carrier gas. The various components of the sample are absorbed and retained by the chromatographic column to different degrees so that the components are separated and exit from the column at different retention times which are characteristic of the components. A suitable detecting device, such as a thermal conductivity measuring and recording device (not shown), is provided at the exit of the chromatographic column and the separated components of the sample are detected and recorded. The exit tubes 53, 54 and 56 and the chromatographic column 57 are all disposed within the enclosure 11 which may be maintained at a suitable temperature by well-known means (not shown). As will be understood by those familiar with gas chromatographic techniques, the chromatographic column 57 may be maintained at a constant temperature or the unit may be temperature programed. In temperature programing the temperature of the column is increased linearly and reproducibly to a predetermined maximum which is dependent upon the volatility of the sample material.

The operating temperature of the chromatographic column 57 within the enclosure 12 will generally be substantially below the test temperature maintained in the block 10, at least during the initial portion of the test. Accordingly, it is important for best operation of the device that the effluent gases from the chambers 18 and 19 pass quickly into the chromatographic column 57 without any intervening temperature drop to a temperature below the operating temperature of the column 57. Although excessive cooling of the exit gases from the chambers 18 and 19 can be avoided by providing auxiliary heaters for the exit tubes 53, 54 and 56, it is an important feature of the present invention that such expedients are generally unnecessary because of the location of the chromatographic column 57 in close proximity to the lower outlet ends of the chambers 18 and 19. Thus, the exit tubes 53, 54 and 56 may have a restricted length so that the effluent gases from the lower ends of the chambers 18 and 19 enter directly into the chromatographic column 57. Thus, there is no opportunity for the exit gases to cool below the operating temperature of the chromatographic column during passage through the exit tubes 53, 54 and 56 which are contained within the temperature-controlled enclosure 12.

In the operation of the device, the tubular containers 38 and 39 are filled with solid material, as at 58 and 59, and inserted in the bores 18 and 19 of the block 10. The fittings 23 and 24 are then installed in the counterbores 21 and 22, and the sample injection ports 26 and 27 are attached to the fittings 23 and 24 by means of the connectors 31 and 32 and also to the carrier gas system by means of the connections 51 and 52. A suitable carrier gas, e.g., helium, hydrogen, nitrogen, air, oxygen, argon, etc., is then passed alternately through the chambers 18 and 19 by manipulation of the valve 47. When changing the carrier gas flow from chamber 18 to chamber 19, or vice versa, gives no change in the base line on the chromatographic recorder, the unit is ready for test.

Assuming that the unit is being used to determine the thermal decomposition products of a test material, the container 39 may be charged with the test solid and the container 38 may be loaded with an inert filler. During the initial portion of the test, the carrier gas is routed through chamber 18 during which time the temperature of the block 10 is raised to a predetermined level. Since the carrier gas by-passes the chamber 19 during this interval, any volatile decomposition products formed from the test material present in the container 39 will collect in the chamber 19. When the desired temperature of the block 10 has been attained and maintained for a chosen interval, the valve 47 is then switched to send the carrier gas through chamber 19 where it picks up the volatile decomposition products which have been formed. These products are then swept through the chromatographic column 57 and the retention times and peak areas corresponding to the various decomposition products are recorded in the usual manner to obtain a chromatogram for the test material.

The valve 47 is now changed back to its former position to send carrier gas through the chamber 18, and while in this position, suitable known materials may be injected into the port 26 so as to obtain a chromatogram of known materials which may be compared with the chromatogram of the test material. Comparison of retention times at identical conditions, which are readily maintained by means of the present invention, makes it possible to determine the identity of the components observed in the chromatogram obtained for the test material. Furthermore, by introducing precisely measured volumes of the known materials into the injection port 26 by means of an accurate microsyringe, the peak areas of both the known and unknown materials may be directly compared so that a quantitative estimate of the decomposition products of the test material is easily made.

If the solid material being tested is a catalyst, its catalytic activity may be determined at any desired temperature level by introducing a standard or known liquid reactant at the sample injection port 27 and then observing the extent of conversion as reflected in the chromatogram on the effluent reaction products. In the case of catalytic studies, the chamber 18 may conveniently be charged with a standard reference catalyst of known properties so that the conversions obtained by the experimental catalyst in chamber 19 can be compared with the conversions obtained with the standard catalyst.

It is also within the scope of the invention to provide more than two chambers in the block 10. For example, a third chamber smiilar to the chambers 18 and 19 is useful when thermla stability and catalytic studies are being carried out on the same material. It will be understood that the exit tube manifold at the lower outlet ends of the chambers and the sample injection port and gas valving arrangement at the upper ends of the chambers will be modified to accommodate the additional chamber. With three chambers being provided, one chamber would contain the test material under study, another chamber would be filled with an inert packing or filler, and the third chamber would contain the standard catalyst. The first and second chambers would then be employed in the manner heretofore described to determine the thermal stability or decomposition products of the test material, and the first and third chambers would then be employed to evaluate the catalytic activity of the test material.

In order to further illustrate the many and varied uses of the apparatus of the present invention, the following specific examples, are presented without, however, limiting the scope of the invention.

EXAMPLE 1

Catalyst activity tests were conducted using a twin-chamber unit of the type illustrated in the drawing. The metal block 10 was a cylinder 1¼ inches in diameter and 4½ inches long, and the chambers 18 and 19 were ⅛ inch diameter holes through the cylinder. The chromatographic column 57 consisted of a 4 foot coiled length of 3/16 inch diameter copper tubing packed with 10–30 mesh Celite (diatomaceous earth) containing approximately 20% by weight of a Dow-Corning silicone oil (D.C. 710). The chromatographic unit was equipped with thermal conductivity cells, and a recorder for detecting and recording changes in composition of the effluent gas from the unit.

A pulse charge of cumene over a sample of catalyst has often been used for establishing the activity of the catalyst. On partial decomposition to propylene and benzene there are three peaks observed in the chromatogram: propylene, benzene, and unreacted cumene. The peaks appear in that order, and the retention time is a function of a carrier gas flow rate and the temperature of the chromatographic column and its liquid phase. Conversion of cumene can be estimated in a number of ways. One of these ways is to express percentage conversion by the area of propylene plus benzene divided by the total peak areas.

Conversions are usually converted to activities by direct comparison with conversions observed on a standard catalyst. At low conversions a catalyst's activity is closely proportional to the number of active sites available to the cumene. Because of the many variables in a chromatographic separation of products and because minor variations in catalyst temperature can make significant variations in conversion, it is desirable to make on-the-spot conversion comparisons at identical conditions. The twin chamber analytical unit of the present invention accomplishes this comparison easily, as described below.

One hundred milligrams of a test catalyst powder formed by the condensation of triphenyl-silanol with aluminum isopropylate was mixed with inert Celite of 45–60 mesh and placed in the stainless steel tube 39 which was then placed in the chamber 19. Three hundred milligrams of a standard silica-alumina powder was charged to stainless steel tube 38 and placed in chamber 18. After ports 26 and 27 were attached, helium as a carrier gas was passed alternately through chambers 18 and 19 until no further change in the recorder base line was observed.

During this flushing out, the temperature of the control unit for the block 10 was set at 350° C. When the temperature lined out at 350° C., one microliter of cumene was charged to port 27 while carrier gas was passed through chamber 19. Conversion by peak areas was 19.3%. Immediately after the cumene peak had registered on the recorder, the valve 47 was changed to send carrier gas through chamber 18 and one microliter of cumene was charged at port 26. Conversion was a 8.7% under exactly comparable conditions. Repeat runs gave 18.5% conversion on the test catalyst and 8.9% on the standard catalyst.

EXAMPLE 2

The same apparatus described in Example 1 was used to evaluate the thermal stability of a silicon resin gasket material.

Three hundred milligrams of a solid silicone resin gasket material mixed with 200 milligrams of inert Celite was introduced in tube 39 to chamber 19, and inert Celite was added to tube 38 and introduced into chamber 18. Ports 26 and 27 were attached, and helium carrier gas was used to sweep out both chambers as the temperature was raised to 100° C. When the recorder base line remained constant on shifting valve 47 to either of its positions, carrier gas was then sent through chamber 18 while the temperature of the unit was raised to 250° C. where it was maintained for five minutes.

A switch valve 47 sent carrier gas to chamber 19. Two very small peaks were observed: one at five seconds, the other at ninety seconds. The five-second peak corresponded to the retention time of methane which seemed to be a likely decomposition product, and this retention time was checked by directing the carrier gas through chamber 18 and charging 30 microliters of methane by syringe through entry port 26.

One-tenth microliter of water charged at port 26 had a retention time of 91 seconds and gave a peak area two or three times the trace of water coming from chamber 19. For 300 milligrams of material, 0.1 microliter of water corresponds to 0.033 part per million. The fact that decomposition was occurring was verified by the observation of significantly greater peaks after the gasket material had been subjected to the temperature of 250° C. for two hours while carrier gas was by-passed through chamber 18. When the carrier gas flow was diverted to chamber 19 a methane peak which was equivalent to 1.3 ml. of methane (by comparison of peak areas with 1 ml. of methane charged at port 26) and 0.86 microliter of water (also by comparison) were observed.

The temperature was raised to 300° C. at which point the methane and water peaks increased in size and several additional peaks appeared having retention times greater than water. These additional peaks were not further investigated although they could have been if the interest had warranted it. This study established a temperature of incipient decomposition and identified the products of incipient decomposition.

EXAMPLE 3

The thermal stability of the silicone resin gasket material in an oxidizing atmosphere was evaluated in the same apparatus and using the same technique described in Example 2 except for the substitution of oxygen as the carrier gas in place of helium.

After bringing the unit to 200° C. there was no evidence of oxidation products in the effluent when the oxygen carrier gas had remained in contact with the gasket material for 30 minutes. However, when the temperature was raised to 250° C. and maintained there for 30 minutes, a switch of the carrier gas from chamber 18 to chamber 19 produced a small $CO_2$ peak and a large water peak. Although the water peak was large, it represented less than one or two parts per million of oxidation of the gasket.

EXAMPLE 4

The same apparatus described in the preceding examples was also used to study both the thermal stability and the catalytic activity of a test material.

A material which was identified by the formula $[\phi_3SiO]_3Al \cdot 3C_3H_7OH$ was known to become catalytic when heated to 320° C. It was desired to study the decomposition of this material and to evaluate its activity for cumene cracking. One hundred milligrams of $$[\phi_3SiO]_3Al \cdot 3C_3H_7OH$$

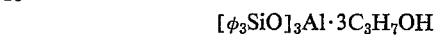

was mixed with inert Chromosorb W (acid washed low surface area fire brick) and charged to tube 39 which was inserted in chamber 19. Tube 38 in chamber 18 was filled with inert Chromosorb W. After sweeping out both chambers by hydrogen carrier gas at room temperature, the temperature of the block 10 was set for 100° C. while carrier gas was passed through chamber 18. At 100° C. the valve 47 was turned to send carrier gas through chamber 19. The chromatographic column was maintained at 80° C. Peaks were observed at 10 seconds, 20 seconds, and 41 seconds. These retention times correspond to propylene, isopropyl alcohol, and benzene, respectively, and were checked by charging these substances at port 26 with carrier gas passing through chamber 18. Propylene, isopropyl alcohol, and benzene continued to be formed at 100° C. in amounts too large to be recorded quantitatively by the chromatographic unit.

When the decomposition products formed only slowly at 100° C., the temperature of the unit was raised quickly to 160° C. and the carrier gas was immediately turned from chamber 18 to chamber 19. Peaks at 10 and 41 seconds were observed corresponding to benzene and propylene. No isopropyl alcohol was formed at the higher temperature. Peaks of propylene and benzene continued to be formed as the catalyst temperature was raised to 320° C.

When decomposition to propylene and benzene had almost ceased at 320° C., one microliter of cumene charged to port 27 with carrier gas passing through chamber 19 gave propylene, benzene, and unreacted cumene peaks corresponding to 9.4% conversion of cumene. Immediately following this measurement of cumene conversion, one half microliter of water was charged at port 27 and carried into the catalyst in chamber 19 by carrier gas. A small propylene peak was followed by a very large benzene peak corresponding to approximately two mols of benzene per mol of water charged. No water exited from the chamber. A charge of one microliter of cumene at port 27 showed 49% conversion.

The determination of the decomposition products formed on heating $[\phi_3SiO]_3Al \cdot 3C_3H_7OH$ and the unusual effect of trace amounts of water on the formation of benzene and on the ability of the catalyst to convert cumene to propylene and benzene represent useful theoretical data for understanding the behavior of catalysts.

Although the invention has been described with particular reference to a certain specific structural embodiment thereof, it should be understood that various modifications and equivalent structures may be resorted to without departing from the scope of the invention as defined in the appended claims.

I claim:

1. An analytical apparatus comprising means defining a plurality of heated and temperature-controlled chambers adapted to contain a solid test material, each of said chambers having an inlet and an outlet, means for introducing a carrier gas selectively into the inlet of any one of said chambers, and a single chromatographic column having a fluid connection with the outlet of each of said chambers for receiving effluent gas therefrom.

2. The apparatus of claim 1 further characterized in that each of said chambers is provided with a removable container for a solid test material.

3. The apparatus of claim 1 further characterized by the provision of at least one injection port associated with one of said chambers for introducing a fluid into the inlet thereof.

4. The apparatus of claim 1 further characterized in that said chromatographic column is disposed in close proximity to the outlets from said chambers whereby to avoid excessive temperature drop of effluent gases passing from said chambers through said fluid connection to said column.

5. The apparatus of claim 1 further characterized in that said first-mentioned means comprises a heat conducting body having a plurality of elongated bores therethrough defining said chambers and each of said bores has removably disposed therein an elongated tubular container for supporting a solid test material therein.

6. The apparatus of claim 1 further characterized by the provision of a pair of said chambers.

7. The apparatus of claim 1 further characterized by the provision of a heat conducting body which comprises said first-named means, said body having a plurality of vertically disposed elongated bores therethrough defining said chambers with the chamber inlets at the upper ends of said bores, a plurality of injection ports each disposed above one of said chambers for introducing a fluid into the inlet thereof, and means for detachably connecting said ports to the inlets of said chambers.

8. The apparatus of claim 7 further characterized in that said last-named means comprises a tubular section between each of said ports and the corresponding chamber inlet, and said means for introducing carrier gas comprises a gas connection with each of said tubular sections between the corresponding port and the corresponding chamber inlet.

9. The apparatus of claim 1 further characterized by the provision of a temperature-controlled enclosure for said chromatographic column, the outlets from said chambers being disposed adjacent the exterior of said enclosure in close proximity to said column at the interior of the enclosure, and said fluid connection extending from said outlets into the interior of said enclosure whereby to provide a relatively short fluid passage for effluent gases from said chamber outlets to said column and thereby avoiding a drop in temperature of said effluent gases below the operating temperature of said column.

10. The apparatus of claim 9 further characterized in that said enclosure has an upper wall, and said means defining said chambers comprises a heat conducting body mounted above said enclosure on said upper wall, said body having a plurality of vertically extending bores defining said chambers with the lower ends of said bores comprising the chamber outlets, and said fluid connection comprising a tubular manifold having tubular portions extending from said outlets through said wall and merging within said enclosure into a common tubular connection with said column.

References Cited

UNITED STATES PATENTS 2,868,011  1/1959  Coggeshall _____ 73—23.1

OTHER REFERENCES

Dale, W. E., Lab. Pract. 15, 997 (1966).

MORRIS O. WOLK, *Primary Examiner.*

R. M. REESE, *Assistant Examiner.*

U.S. Cl. X.R.

23—232, 254; 73—23.1